May 31, 1938.   G. MEERBECK   2,118,893
JOINTING OF TUBES OF THERMOPLASTIC MATERIAL
Filed Feb. 18, 1937
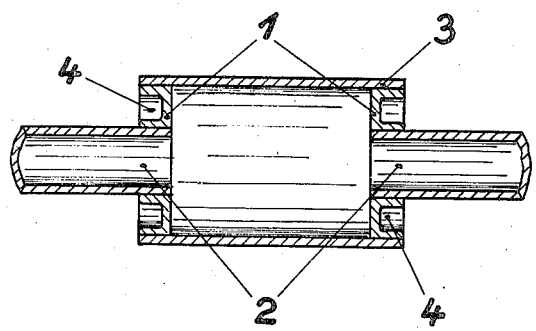
G. Meerbeck
Inventor
By Glascock Downing & Seebold
Attys.

Patented May 31, 1938

2,118,893

UNITED STATES PATENT OFFICE 2,118,893

JOINTING OF TUBES OF THERMOPLASTIC MATERIAL

Gottfried Meerbeck, Cologne-Mulheim, Germany, assignor to Felten & Guilleaume Carlswerk Actien-Gesellschaft, Cologne-Mulheim, Germany Application February 18, 1937, Serial No. 126,477
In Germany February 24, 1936

1 Claim. (Cl. 18—59)

The use of tubes of thermoplastic material to serve as flexible pressure-resisting oil-, water-, and gas-tight coverings of cables, more particularly oil or gas-filled cables, especially oil-filled pressure cables, have the advantage, as compared with the coverings of lead or other metals hitherto used, that they are more readily bendable and, above all, that the electric losses are smaller than in the case of metal tubes. In order that such tubes shall withstand an internal super-atmospheric or sub-atmospheric pressure they may be provided with pressure-resisting means, which may, for instance, consist of a pressure-resisting helix, which, according to requirements, may be provided on the outer or inner surface, or be embedded in the thermoplastic material of the covering.

However, great difficulties are encountered with respect to the jointing of the tubes of thermoplastic material, since they cannot be welded together as in the case of metal tubes, and the parts to be jointed together must be strongly pressed against one another while being simultaneously heated.

Referring to the form of construction illustrated in longitudinal section in the accompanying drawing, the connection is effected without any metallic insertions, by using connecting pieces of thermoplastic material in the form of circular members of ⊏-shaped cross-section and by placing thereon suitable sleeves of thermoplastic material. First of all the circular member 1 is provided at one end of the tube 2. A pressure-resisting supporting member may be inserted in the tube 2 and be subsequently removed. In order to be able to press together the sleeve 3 and the connecting member 1 a pressure-resisting metal ring is inserted in the recess 4 of the said connecting member 1, which metal piece may be removed after the connection has been effected.

Preferably, the construction, hereinbefore described, may be surrounded on the outside with a pressure-resisting tubular sleeve if the tubes have to withstand high internal pressures.

What I claim is:—

A method of jointing long tubes of thermoplastic material for serving as bendable, pressure-resisting, oil-, water-, and gas-tight coverings of cables under the application of pressure and heat, consisting in placing circular thermoplastic members of ⊏-shaped cross-section on the ends of the tubes to be jointed together and a thermoplastic sleeve on the said circular members, supporting the said ends of the tubes together with the said thermoplastic members and sleeve by pressure-resisting rings inserted in the said circular members during the application of heat and pressure, and removing the said pressure-resisting rings.

GOTTFRIED MEERBECK.